United States Patent
Eppe et al.

(10) Patent No.: US 6,485,329 B2
(45) Date of Patent: Nov. 26, 2002

(54) CONNECTING ELEMENT FOR TWO ITEMS OF INSTALLATION EQUIPMENT LINED UP BESIDE EACH OTHER WITH THEIR BROAD SIDES AGAINST EACH OTHER, AND METHOD OF CONNECTING THE ITEMS OF INSTALLATION EQUIPMENT

(75) Inventors: Klaus-Peter Eppe, Waldbrunn (DE); Volker Schmitt, Bammental (DE); Ralf Weber, Heidelberg (DE); Alexander Orban, Weinheim (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 09/741,248

(22) Filed: Dec. 18, 2000

(65) Prior Publication Data

US 2001/0006857 A1 Jul. 5, 2001

(30) Foreign Application Priority Data

Dec. 18, 1999 (DE) .......................... 199 61 242

(51) Int. Cl.$^7$ ............................................. H01R 13/60
(52) U.S. Cl. ....................................................... 439/570
(58) Field of Search ................................ 439/570, 533, 439/529, 59, 60, 492, 61, 675, 578, 825, 607, 329, 347; 24/297, 453, 581.11

(56) References Cited

U.S. PATENT DOCUMENTS

| | | | | |
|---|---|---|---|---|
| 4,609,119 A | * | 9/1986 | Richter, Sr. ................. 220/295 |
| 5,194,017 A | * | 3/1993 | Consoli ........................ 439/39 |
| 5,223,674 A | * | 6/1993 | Reznikov ................. 174/138 D |
| 5,241,451 A | * | 8/1993 | Walburn et al. ............ 361/785 |
| 5,533,908 A | * | 7/1996 | Henri et al. ................. 439/429 |
| 5,556,315 A | * | 9/1996 | Kagawa .......................... 445/7 |
| 5,562,506 A | * | 10/1996 | Wright ........................ 439/675 |
| 5,626,482 A | * | 5/1997 | Chan et al. ................... 439/74 |
| 5,775,861 A | * | 7/1998 | Leon et al. .................... 24/297 |
| 6,322,126 B1 | * | 11/2001 | Kraus .......................... 24/297 |

FOREIGN PATENT DOCUMENTS

EP 1079475 * 3/2001 ......... H01R/13/648

* cited by examiner

Primary Examiner—Brian Sircus
Assistant Examiner—J. F. Duverne
(74) Attorney, Agent, or Firm—Laurence A. Greenberg; Werner H. Stemer; Gregory L. Mayback

(57) ABSTRACT

A connection for two items of installation equipment lined up beside each other with their end or broad sides against each other, in particular line-protection circuit breakers, residual current circuit breakers and the like, whose housings are each formed from two shell-shaped housing parts. The connecting element has an approximately cylindrical base body with a first outer diameter onto which, on both sides, two radially springy spreading arms projecting axially in opposite directions are integrally molded. The outside diameter of the spreading arms is smaller than the outside diameter of the base body and free ends of the spreading arms have radially protruding lugs which, when assembled, latch in behind protrusions on the housings of the items of installation equipment located beside each other and to be connected by the connecting element.

8 Claims, 2 Drawing Sheets

CONNECTING ELEMENT FOR TWO ITEMS OF INSTALLATION EQUIPMENT LINED UP BESIDE EACH OTHER WITH THEIR BROAD SIDES AGAINST EACH OTHER, AND METHOD OF CONNECTING THE ITEMS OF INSTALLATION EQUIPMENT

BACKGROUND OF THE INVENTION

Field of the Invention

A connecting element is provided for connecting two items of installation equipment to each other. The two items of installation equipment each have a housing formed of two shell-shaped housing parts having protrusions extending out from the housing parts, each housing has a broad side and the broad side of each housing is lined up beside each other and against each other.

A single-pole electrical line-protection circuit breaker has a housing that has a shell-like configuration, the front edges of the shell walls are placed against each other. The two shells are fixed to each other by rivets.

Such single-pole line-protection circuit breakers can be combined to form multi-pole circuit breakers. It is known to rivet the individual poles to each other.

Such riveted connections are technically complicated, since, first, they make it necessary to keep a stock of rivets and, second, an operation has to be provided with which the riveting is performed.

SUMMARY OF THE INVENTION

It is accordingly an object of the invention to provide a connecting element for two items of installation equipment lined up beside each other with their broad sides against each other, and a method of connecting the items of installation equipment which overcome the above-mentioned disadvantages of the prior art methods and devices of this general type, in which the connection operation of the two items of installation equipment that are to be connected to each other is simplified.

With the foregoing and other objects in view there is provided, in accordance with the invention, a connecting element for connecting two items of installation equipment to each other. The two items of installation equipment each have a housing formed of two shell-shaped housing parts having protrusions extending out from the housing parts. The housing has an end side and the end side of each housing is lined up beside each other and against each other. The connecting element contains a substantially cylindrical shaped base body having an outer diameter, and two radially springy spreading arms integrally molded to the base body and projecting axially in opposite directions from the base body. The two spreading arms have an outside diameter being smaller than the outside diameter of the base body and free ends with radially protruding lugs forming the free ends. The lugs latching in behind the protrusions formed on the housing of each of the two items of installation equipment located beside each other for connecting the two items of installation equipment to each other.

According to the invention, the connecting element has an approximately cylindrical base body with a first outside diameter onto which, on both sides, two radially springy spreading arms project axially in opposite directions are integrally molded. The radial outer contour constitutes a cylindrical surface and their free ends have radially protruding lugs which, when assembled, latch in behind protrusions on the housings of the items of installation equipment to be connected by the connecting part.

The assembly, that is to say the method of assembling the two items of installation equipment using the connecting element configured in accordance with the invention is then simple. The connecting element is pushed with its spreading arms into one housing and the other housing is slipped over the spreading arms projecting from the one housing, which produces the connection between the two items of installation equipment. As far as the outlay on assembly is concerned, this type of connection is very simple and can be carried out without tools. When connecting two or more line-protection circuit breakers to form a multi-pole device, additional operations, which would be necessary to place the switches on one another, are no longer needed.

According to an advantageous refinement of the invention, the connecting element has the shape of a sleeve that has an axial longitudinal slot that is disposed centrally. With this refinement, the base body is also springy, so that it serves to center the items of installation equipment located beside each other.

In this way, by use of the one longitudinal slot, the spreading arms are separated from each other on one side; in order to form the spreading arms, further slots are introduced in the area of the spreading arms, diametrically opposite the longitudinal slot, and matched to the first.

In order that the assembly of the connecting elements is simplified, the free ends of the arms with the lugs are tapered conically to a point, so that the diameter of the sleeve shape at the ends is smaller than the diameter in the area of the lugs.

In order that tolerances in the housings can be compensated for, the transition face of the base body to the spreading arms and the transition face from the spreading arms to the lugs is in each case conical, the cone angle being slightly less than 180°.

This achieves the situation where the protrusion bears on the lugs, even in the event of an unfavorable tolerance situation.

In order that the connecting element remains firmly held between the two housings, a pin is inserted into the interior of the sleeve for fixing the connecting element in place. The pin prevents the longitudinal edges of the longitudinal slot or of the spreading arms springing towards one another. If, for example, an auxiliary switch is to be fixed to an item of switchgear, such a pin is generally not necessary. Ultimately, the pin is not necessary when the elasticity of the connecting element is not high, that is to say the connecting element is relatively stiff.

In accordance with an added feature of the invention, the base body combined with the spreading arms are in a form of a sleeve having an axial longitudinal slot formed therein disposed centrally between the lugs.

In accordance with an additional feature of the invention, the lugs each have a free end that is tapered conically to a point.

In accordance with another feature of the invention, the base body has end faces, onto which the spreading arms are integrally molded, are obtusely conically shape with cone angles being open towards each other, and in that a cone angle is less than 180°.

In accordance with a further feature of the invention, the lugs have rear faces disposed opposite the end faces of the base body, the rear faces have a conical shape with a cone angle that is open in an opposite direction and is less than 180°.

In accordance with another added feature of the invention, a pin is disposed in the axial longitudinal slot of the sleeve, the pin fixes and prevents the spreading arms from springing towards each other.

In accordance with another additional feature of the invention, the two items of installation equipment are selected from the group consisting of line-protection circuit breakers and residual current circuit breakers.

With the foregoing and other objects in view there is provided, in accordance with the invention, a method for connecting two items of installation equipment. The method includes providing a connecting element formed of a substantially cylindrical base body having an outer diameter, and two radially springy spreading arms integrally molded to the base body and projecting axially in opposite directions from the base body. The two spreading arms each have an outside diameter being smaller than the outside diameter of the base body and free ends with radially protruding lugs. The connecting element is latched into a first item of installation equipment having an opening formed therein for receiving the connection element. The first item of installation equipment has protrusions extending into the opening and disposed on a broad side for latching the connecting element. A second item of installation equipment is pressed against the first item of installation equipment, at right angles to the broad side of the first item of installation equipment. The connecting element is received in an opening formed in the second item of installation equipment and held by protrusions extending into the opening on a broad side of the second item of installation equipment.

Other features which are considered as characteristic for the invention are set forth in the appended claims.

Although the invention is illustrated and described herein as embodied in a connecting element for two items of installation equipment lined up beside each other with their broad sides against each other, and a method of connecting the items of installation equipment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
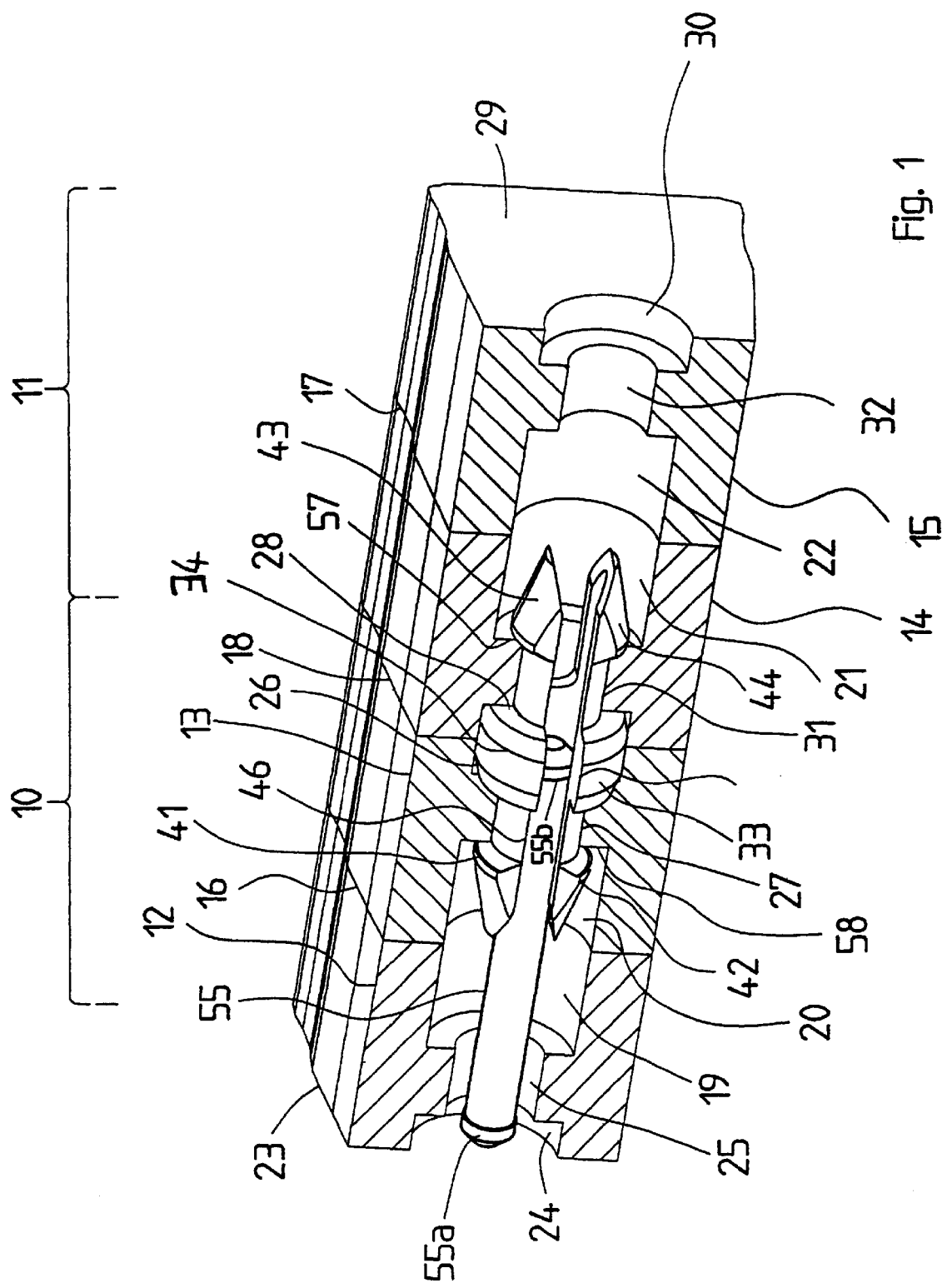
FIG. 1 is a diagrammatic perspective, cut-away view of two items of installation equipment with a connecting element according to the invention.

In all the figures of the drawing, sub-features and integral parts that correspond to one another bear the same reference symbol in each case. Referring now to the figures of the drawing in detail and first, particularly, to FIG. 1 thereof, there is shown a partial sectional view of two housings 10 and 11 disposed beside each other and belonging to an item of installation switchgear. Each of the housings 10, 11 is composed of two shell-shaped housing parts 12, 13 and 14, 15. A dividing joint between the housing parts 12 and 13 bearing the reference number 16, and a dividing joint between the housing parts 14 and 15 bearing the reference number 17 are provided. A contact area of the two housings 10, 11 is designated by 18.

Starting from the dividing joints 16, 17, each housing part has a cylindrical depression 19, 20 and 21, 22 which, when assembled and when the two housing parts 12, 13 and 14, 15 are placed against each other, form a cylindrical internal space with one another. On an end or broad side 23 of the housing part 12 there is a depression 24, which is connected to the depression 19 by an aperture 25. In a similar way, an end or broad side of the housing part 13, which forms the dividing joint or contact face 18, has a depression 26 which opens into this face and is connected to the depression 20 by a through hole 27.

Between a depression 28 and a depression 30 which is open towards an end or broad side 29 there is likewise in each case a through hole 31, 32, the depressions 19, 20, 21 and 22, 24 and 30 being aligned with one another, as are the through holes 25, 27, 31, 32.

Figure 2:
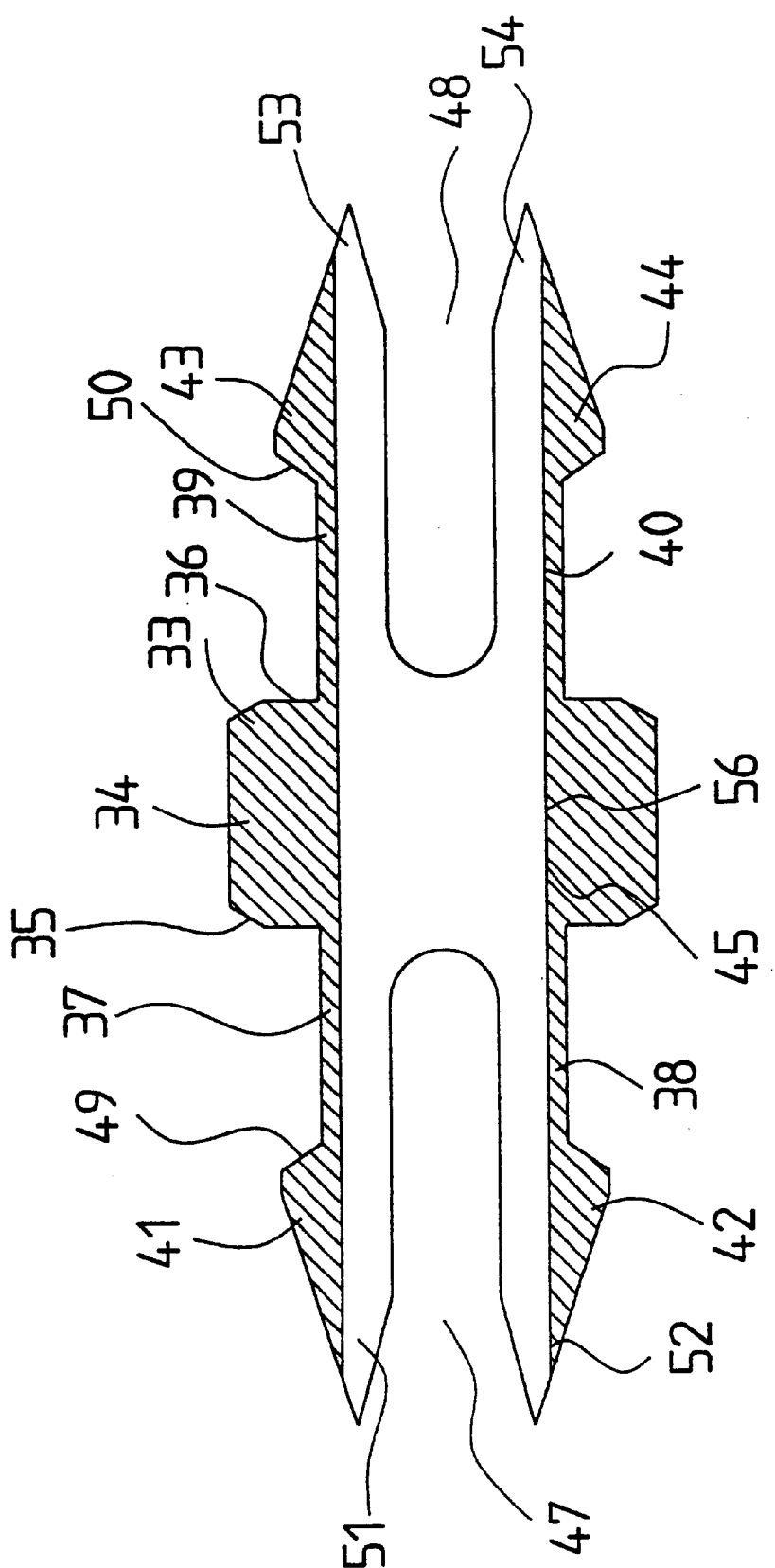
FIG. 2 is a longitudinal sectional view through the connecting element.

Inserted into these depressions and through holes is a connecting element 33, which is illustrated in section in FIG. 2.

The connecting element 33 has a cylindrical base body 34 which is located at the center, and springy spreading arms 37, 38, 39 and 40 which protrude in an axial direction from the ends 35 and 36 of the base body 34. An outer diameter of the base body 34 is selected such that it fits into the depressions 26, 28. A cylindrical surface enclosing the spreading arms 37 to 40 has an outer diameter that corresponds to an inner diameter of the through holes 25, 27, 31 and 32. In each case, lugs 41, 42, 43 and 44 are integrally molded with the spreading arms 37 to 40, protrude radially in opposite directions and are located on diametrically opposite ends.

It can be seen from FIG. 1 that the lugs 41, 42, 43 and 44 have an outer surface which forms a conical shape or truncated conical shape, the truncated cones tapering towards free ends of the spreading arms 37, 38, 39 and 40.

A longitudinal hole 45 passes through the spreading arms 37, 38, 39 and 40 and the base body 34, SO that this results in a sleeve shape for the connecting element. The sleeve shape has a longitudinal slot 46 and, together with slots 47 and 48, which project approximately as far as into the direction of the base body 34, the springy spreading arms 37 to 40 are formed.

It can be seen from FIG. 2 that the end walls 35 and 36 form a conical shape whose open sides are oriented towards each other; the cone angle is slightly less than 180°. It is a very obtuse cone angle.

On their faces 49 and 50 opposite the end faces 35 and 36, the lugs 41 to 44 likewise have a conical shape, which is open towards the free end and likewise has a similar opening angle to that of the end faces 35 and 36.

The conical faces 35, 36; 49, 50 are used to compensate for tolerances in the longitudinal extent of the holes 25, 27, 31 and 32 and tolerances in the diameters.

FIG. 2 shows—just like FIG. 1—that the slots 47 and 48 and the longitudinal slot 46 have a widening 51, 52, 53 and 54 in the area of the lugs. The widenings are used to insert a pin 55 into a through hole 56, which prevents the sleeve shape of the connecting element giving way springily inwards by the mutually opposite edges of the longitudinal slot springing towards each other. To this extent, the pin 55 is a locking element.

For the purpose of assembly, first the two housing parts 12, 13 and 14, 15 are put together to form one item of installation equipment 10 and 11 in each case. Then, the connecting element is led with the spreading arms 39, 40 through the passage opening 31; as soon as they have slid through the passage opening 31, they engage behind protrusions 57 which adjoins the passage opening.

For the purpose of fastening the other item of installation equipment 10, the latter is plugged with the opening 27 over the lugs 41, 42 until the lugs 41, 42 engage behind the protrusion 58 in the through opening 27. The pin 55 can then be inserted into the interior of the connecting element, and the spreading arms 37 to 40 are prevented from springing towards each other.

At its free ends, the pin 55 has a circumferential thickening 55a, 55b in each case, by which tolerances can also be compensated for here.

Only one connecting element is illustrated in FIGS. 1 and 2. In order to connect two items of installation equipment located beside each other, for example two line-protection circuit breakers, to form a two-pole line-protection circuit breaker, three or four connecting elements would then be necessary.

A three-pole line-protection circuit breaker could also be produced from the two-pole one with the two poles 10, 11. For this purpose, the connecting element 33 is plugged with the spreading arms 37, 38 through the opening 32 until the lugs 41, 42 latch into the depression 22; a further item of switchgear is then latched over the latching arms 39 and 40.

As opposed to a riveted connection, such a spreading connection is simple. Inventory keeping corresponds to stock keeping for the rivets; however, assembly is simplified, since an additional riveting operation is avoided.

The internal space of the sleeve does not have to be circularly cylindrical; the internal space can also be bounded by two approximately parallel walls. The circularly cylindrical shape is preferably used when there is a possibility that the pin 55 must be inserted.

The circularly cylindrical shape is practical for stock keeping reasons, since it is then possible for only one type of connecting element to be kept in store.

We claim:

1. A connecting element for connecting two items of installation equipment to each other, the two items of installation equipment each having a housing formed of two shell-shaped housing parts having protrusions extending out from the housing parts, the housing having an end side and the end side of each housing being lined up beside each other and against each other, the connecting element comprising:
   a substantially cylindrical shaped base body having an outer diameter; and
   two radially springy spreading arms integrally molded to said base body and projecting axially in opposite directions from said base body, said two spreading arms have an outside diameter being smaller than said outside diameter of said base body and free ends with radially protruding lugs forming said free ends, said lugs latching in behind the protrusions formed on the housing of each of the two items of installation equipment located beside each other for connecting the two items of installation equipment to each other.

2. The connecting element according to claim 1, wherein said base body combined with said spreading arms are in a form of a sleeve having an axial longitudinal slot formed therein disposed centrally between said lugs.

3. The connecting element according to claim 1, wherein said lugs each have a free end that is tapered conically to a point.

4. The connecting element according to claim 1, wherein said base body has end faces, onto which said spreading arms are integrally molded, are obtusely conically shape with cone angles being open towards each other, and in that a cone angle is less than 180°.

5. The connecting element according to claim 4, wherein said lugs have rear faces disposed opposite said end faces of said base body, said rear faces have a conical shape with a cone angle that is open in an opposite direction and is less than 180°.

6. The connecting element according to claim 2, including a pin disposed in said axial longitudinal slot of said sleeve, said pin fixing and preventing said spreading arms from springing towards each other.

7. The connecting element according to claim 1, wherein the two items of installation equipment are selected from the group consisting of line-protection circuit breakers and residual current circuit breakers.

8. A method for connecting two items of installation equipment, which comprises the steps of:
   providing a connecting element formed of:
      a substantially cylindrical base body having an outer diameter; and
      two radially springy spreading arms integrally molded to the base body and projecting axially in opposite directions from the base body, the two spreading arms each have an outside diameter being smaller than the outside diameter of the base body and free ends with radially protruding lugs;
   latching the connecting element into a first item of installation equipment having an opening formed therein for receiving the connection element, the first item of installation equipment having protrusions extending into the opening and disposed on a broad side for latching the connecting element; and
   pressing a second item of installation equipment against the first item of installation equipment, at right angles to the broad side of the first item of installation equipment, the connecting element received in an opening formed in the second item of installation equipment and held by protrusions extending into the opening on a broad side of the second item of installation equipment.

* * * * *